Sept. 29, 1953  C. SAURER ET AL  2,653,684
FRICTION TYPE SHOCK ABSORBER
Filed Sept. 14, 1950  2 Sheets-Sheet 1
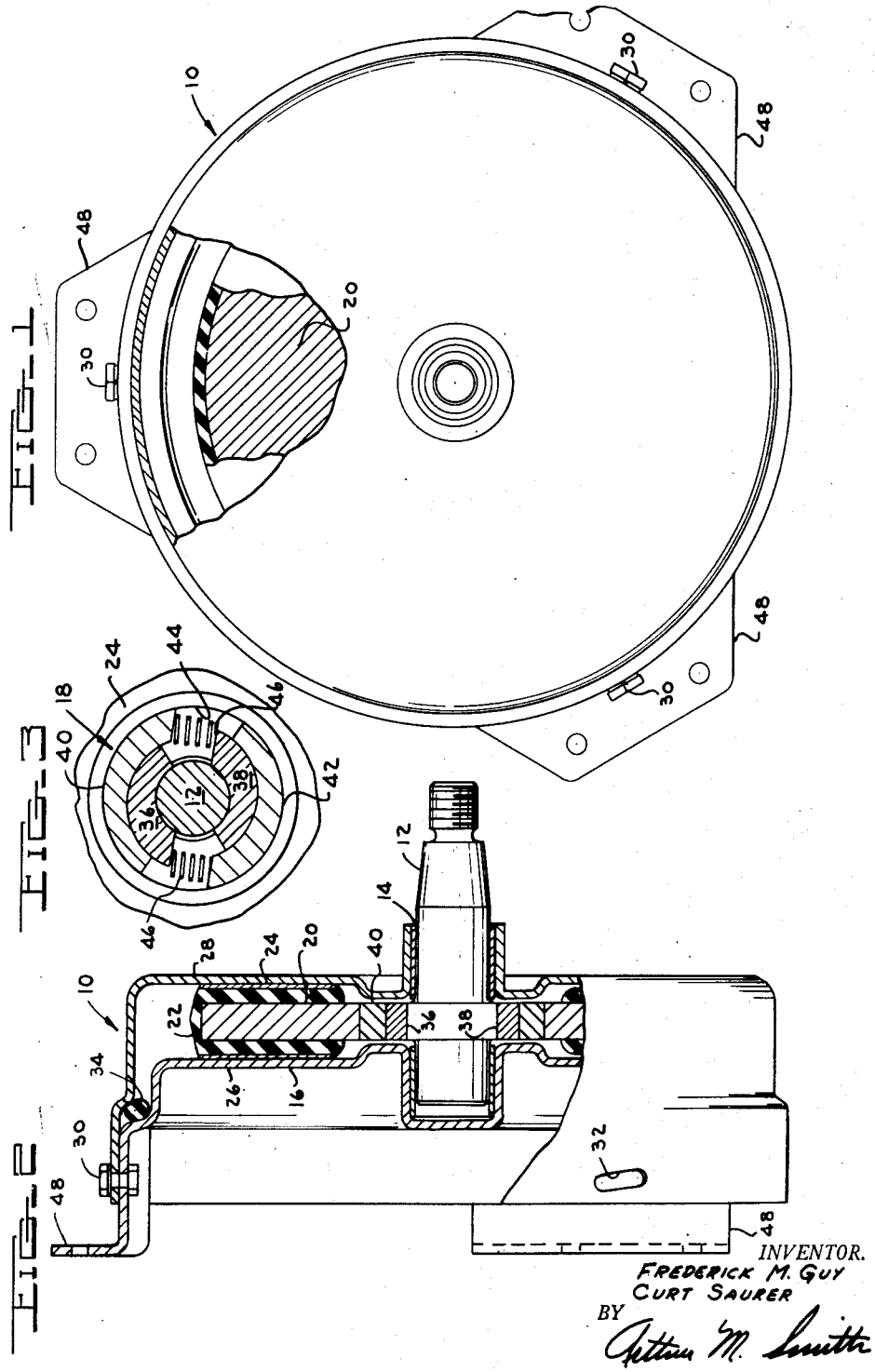
INVENTOR.
FREDERICK M. GUY
CURT SAURER
BY
Arthur M. Smith
ATTORNEY

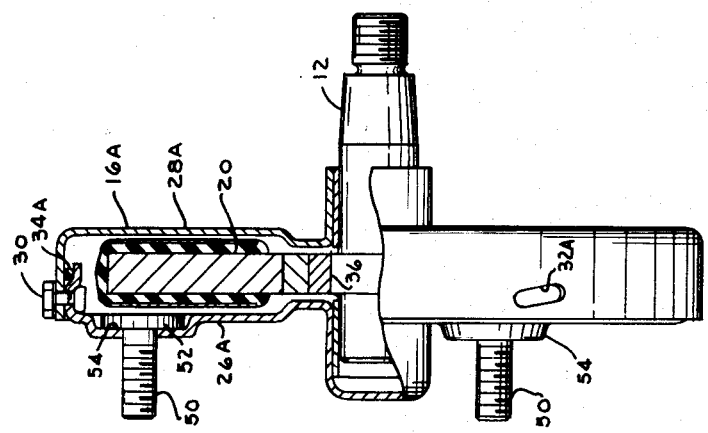
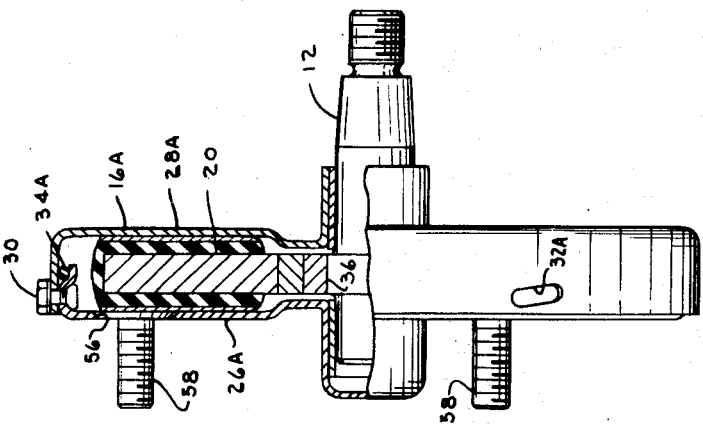

Patented Sept. 29, 1953

2,653,684

UNITED STATES PATENT OFFICE 2,653,684

FRICTION TYPE SHOCK ABSORBER

Curt Saurer and Frederick M. Guy, Detroit, Mich., assignors to U. S. Universal Joints Company, a corporation of Michigan Application September 14, 1950, Serial No. 184,847

4 Claims. (Cl. 188—130)

The present invention relates to dampening devices, generally known as shock absorbers, and more particularly to friction-type dampeners, principally, but not exclusively, adapted for use with motor vehicles and the like.

Heretofore, friction and hydraulic devices have been used in varying degrees for controlling impact and rebound of springs. Friction-type shock absorbers generally have been constructed to have the same energy absorption on impact and rebound, while hydraulic devices provide little dampening on impact as compared with the dampening on rebound. However, these prior hydraulic devices have been found to provide irregular, peaked or concentrated dampening action at some portion of the travel.

It is very desirable to use dampening devices on motor vehicles, which devices provide dampening on the rebound only, since this is found to result in a more comfortable ride being obtained.

Accordingly, it is a principal object of the present invention to provide a dampening device for use with motor vehicles which is adapted to provide a smooth, instantaneous, constant check on the rebound, thereby eliminating any formation of supplementary excess acceleration following the initial impact whereby the optimum riding comfort for the passengers can be obtained, said dampening device being a friction-type which is unaffected by temperature or humidity.

It is another object of the present invention to provide a friction-type shock absorber for use with motor vehicles and the like, and which shock absorber is constructed and arranged to provide a one-way cushioning action for absorbing shock imparted to the wheels of a motor vehicle, thereby to reduce considerably the wear of the shock absorber so as to provide a longer life thereof and permit construction therof at a lower initial cost.

It is still another object of the present invention to provide a shock absorber for use with motor vehicles and the like, and which shock absorber is a friction disc type characterized by its relatively simple construction and few parts, and which is constructed to permit adjusting of the frictionally engaging surfaces therein during initial installation thereof and to compensate for subsequent wear which may occur in the friction material of the friction disc.

Other objects of this invention will appear in the following description and appended claims, reference being had to the accompanying drawings forming a part of this specification wherein like reference characters designate corresponding parts in the several views.

In the drawings:

Fig. 1 is a front elevational view, partly in section, of one embodiment of the present invention;

Fig. 2 is a side elevational view, partly in section, of the embodiment of the present invention shown in Fig. 1;

Fig. 3 is a fragmentary sectional view of the clutch mechanism of the embodiment of the invention shown in Figs. 1 and 2;

Fig. 4 is a modification of the present invention showing a different housing construction from that of the embodiment of Figs. 1 and 2; and Fig. 5 is still another modification of the present invention wherein the supporting structure for the housing of Fig. 4 has been varied.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Figs. 1 to 3 of the drawings, a shock absorber 10 is shown having a shaft 12 journaled in bushings 14 which are mounted within the housing 16. A clutch mechanism 18, which will be described more fully hereinafter, is mounted on the shaft 12 and is adapted to carry a disc 20.

The disc 20 has a friction material secured to its opposite faces which comprises the rubber material 22, which has the cotton material 24 impregnated with graphite bonded to its opposite surfaces. A friction material such as this is found very desirable because it is not materially affected by normal temperatures and humidity conditions, and further because the graphite acts as a lubricant for this device so as to reduce the wear on the friction material.

The graphite impregnated cotton material 24 is adapted to frictionally engage the opposite sides of the housing 16. The housing 16 is formed from the telescoping sections 26 and 28, and by virtue of this construction, these sections can be moved axially with respect to one another to vary the extent of frictional engagement of the sides of the housing 16 with the friction surfaces of the disc 20.

When a suitable adjustment of the sections 26 and 28 with respect to the friction surfaces of the disc 20 has been obtained, the sections 26 and 28 can be rigidly secured together by the plurality of bolt and nut assemblies 30.

As can be seen in Fig. 2, the nut and bolt assembly 30 extends through the angularly disposed slots 32 formed in the sections 26 and 28 of the housing 16. Axial movement of the opposite sections 26 and 28 with respect to one another is obtained merely by rotation of one of the sections with respect to the other. It is believed to be readily apparent that as the one section is rotated with respect to the other, the bolt extending through the angular slots 32 will cause relative axial displacement of the opposite sections 26 and 28.

Disposed between the opposite sections 26 and 28 is a soft rubber gasket 34, or the like, which is adapted to provide a seal between the opposite sections 26 and 28 to prevent dirt, water, and the like, from entering into the interior of the shock absorber 10.

Referring to Figs. 2 and 3, the clutch mechanism adapted for use with the present shock absorber can be seen. Disposed on opposite sides of the shaft 12 are a pair of floating cam members 36 and 38. Disposed about the outer surfaces of the floating cams 36 and 38 are two freely moving crescent-shaped members 40 and 42, which fit within the hub 44 of the disc 20. A pair of coil springs 46 are disposed, respectively, between the one end of the floating cam 38 and the adjacent end of crescent-shaped member 40, and the one end of floating cam 36, and the corresponding end of crescent-shaped member 42.

The springs are mounted so that they will bias the floating cams 36 and 38 in a direction of counter-rotation to the crescent-shaped members 40 and 42, and thereby hold them in an operative position. Due to the shape of the floating cam members 36 and 38, and the crescent-shaped members 40 and 42, the rotation of the shaft 12 in a clockwise direction as seen in Fig. 3 will cause the floating cam members 36 and 38 and the crescent-shaped members 40 and 42 to be wedged snugly together causing a tight frictional driving engagement, which in turn, causes the disc 20 to move with the shaft 12. This movement is resisted by the frictional engagement between the friction material on the disc 20 and the opposite inner walls of the housing 16.

Upon release of the forces tending to cause rotation of the shaft 12, permitting the shaft 12 to be returned to its normal position, the frictional engagement between the floating cams 36 and 38 and the crescent-shaped members 40 and 42 will be released so that the disc 20 with its friction surfaces will not oppose the counter-clockwise rotation of the shaft 12. As explained above, the shock absorber 10 will be held in a normal position to absorb shocks imparted thereto by virtue of the compression springs 46 which will maintain the clutch mechanism in its normal position.

The present shock absorber 10 is intended to be mounted on a supporting surface of a motor vehicle or the like, through the plurality of flange members 48, and the shaft 12 is intended to be connected by a lever arm, not shown, to the spring structure of the motor vehicle or the like. By this construction, when the motor vehicle, or the like, receives a shock which is transmitted through the springs thereof, the lever arm, not shown, will cause clockwise rotation of the shaft 12 on the rebound of the vehicle so as to engage the clutch mechanism 18 and thereby cause the frictional material of the disc 20 to absorb the shock imparted to the motor vehicle or the like. As can be readily seen, the shock absorber provides a one-way cushioning action in that after the initial shock has been absorbed by the shock absorber, the disc 20 will not be rotated with the shaft 12 back to the position it had prior to movement, but will remain relatively motionless. This follows since the disc 20 will be released by the clutch 18 from counter-clockwise rotation of shaft 12. In this way, the wear of the frictional material on the disc 20 will be substantially ½ of what it would have been if the disc 20 were integrally formed on the shaft 12.

When the present shock absorber 10 has been in use for considerable time so that the friction material of the disc 20 may have become worn, the shock absorber can be readily adjusted for continuous use merely by moving the section members 26 and 28 axially together as was described above.

Modifications of the present invention can be seen in Figs. 4 and 5 wherein like reference numbers indicate like parts. The modification of Fig. 4 is substantially the same as that of Figs. 1–3 except that a different construction is provided for the housing 16A and for the supporting means.

The housing 16A is formed from the telescoping sections 26A and 28A, which can be moved axially with respect to one another to vary the pressure on the disc 20. The sections 26A and 28A have angularly disposed apertures 32A through which nut and bolt assemblies extend for securing said sections together. By virtue of the angularly disposed apertures 32A, the sections 26A and 28A can be axially adjusted by rotation of one of said sections with respect to the other for purposes more fully set out in the description of the modification shown in Figs. 1 to 3.

As in the previously described modification, a soft rubber gasket 34A, or the like, is provided to prevent water, dirt, grease, etc., from entering the housing 16A.

The housing 16A can be secured to a supporting surface (not shown) of a motor vehicle by the plurality of bolts 50 which have their heads 52 seated in recessed portions 54 of the section 26A. This supporting construction is desired for use when a relatively limited space is provided for mounting the present dampening device.

Fig. 5 shows a modified form similar to that of Fig. 4. As can be seen, this modification differs in that countersunk apertures 56 are provided into which the heads of the bolts 58 are seated. In other respects, this modification is constructed and operates the same as that of Fig. 4.

As is believed to be readily understood from the above description, the present shock absorber will have a relatively long life, since the wear of the shock absorber will be reduced to a minimum, and as a result of the reduced wear of the present shock absorber, the need for future adjustments will be appreciably reduced.

Further, a dampening device or shock absorber has been provided which is particularly adapted by virtue of its construction to ensure the optimum riding comfort for passengers of the motor vehicle employing such device. As is believed understood from the above description, the device is particularly adapted to check smoothly and quickly the rebound of the vehicle after an initial shock, while in no way attempting to cushion the initial bound. This type of operation ensures that no supplementary acceleration will be imparted to the vehicle by the dampening device on subsequent bounds of the vehicle as is often the case with prior types of dampening devices or shock absorbers.

The present invention is also characterized by its relatively simple construction and the few parts thereof, enabling it to be manufactured and sold at relatively low cost. Further, it can be easily installed on a motor vehicle or the like, and can be adjusted for use merely by drawing the opposite sections 26 and 28 of the housing 16 into snug engagement with the friction material of the disc 20.

It should be understood that where it is desirable to dampen a spring oscillation as quickly as possible, regardless of discomfort to passengers, a second dampening device of different capacity may be added working in opposite direction to the main dampening device.

Having thus described our invention, we claim:

1. A shock absorber comprising a shaft, a disc having friction surfaces on its opposite faces, clutch means mounted on said shaft for operatively connecting said shaft with said disc, a cylindrical housing enclosing said disc and being formed from two sections joined together at their outer peripheries, one of said sections overlapping the other section and being secured thereto by a plurality of bolts extending through circumferentially inclined elongated apertures spaced about the outer peripheries of said sections, whereby the axial spacing between said sections can be varied to provide desired frictional engagement of said sections with said friction surfaces of said disc.

2. A shock absorber as claimed in claim 1 wherein an annular gasket is clamped between the overlapping portions of said sections to provide a seal for said housing.

3. A shock absorber comprising a shaft, a disc having friction surfaces thereon, which friction surfaces are formed from a layer of rubber bonded to said disc and a graphite impregnated fabric bonded on the outer surface of said rubber, clutch means interposed between said shaft and said disc for rotating said friction disc with said shaft when the latter is rotated in one direction and for releasing said disc when said shaft is rotated in the opposite direction, and a housing having portions of its walls in frictional engagement with the friction surfaces of said disc.

4. A shock absorber comprising a shaft, a disc having friction surfaces thereon, which friction surfaces are formed from a layer of rubber bonded to said disc and a graphite impregnated fabric bonded on the outer surface of said rubber, clutch means interposed between said shaft and said disc for rotating said friction disc with said shaft when the latter is rotated in one direction and for releasing said disc when said shaft is rotated in the opposite direction, a housing having portions of its walls in frictional engagement with the friction surfaces of said disc, and means for adjusting the relative position of said portions of the housing walls with respect to said friction surfaces of said disc whereby suitable pressure may be maintained by said housing wall portions on said friction surfaces of said disc to permit limited rotation of said disc with respect to said housing.

CURT SAURER.
FREDERICK M. GUY.

References Cited in the file of this patent

UNITED STATES PATENTS

| Number | Name | Date |
| --- | --- | --- |
| 1,819,855 | Wilson | Aug. 18, 1931 |
| 1,921,951 | Simon et al. | Aug. 8, 1933 |
| 2,354,428 | Saurer | July 25, 1944 |

FOREIGN PATENTS

| Number | Country | Date |
| --- | --- | --- |
| 449,024 | France | Feb. 15, 1913 |

OTHER REFERENCES

Ser. No. 303,885, Cupper (A. P. C.), published May 18, 1943.